United States Patent [19]

Imai

[11] Patent Number: 5,400,332
[45] Date of Patent: Mar. 21, 1995

[54] COMMUNICATION SYSTEM BETWEEN COMMUNICATION CARDS MOUNTED SEPARATELY IN SHELVES

[75] Inventor: Shunji Imai, Hyogo, Japan

[73] Assignee: Mitsubishi Denki Kabushiki Kaisha, Tokyo, Japan

[21] Appl. No.: 8,159

[22] Filed: Jan. 25, 1993

[30] Foreign Application Priority Data

Feb. 6, 1992 [JP] Japan ................. 4-054178

[51] Int. Cl.[6] ............................. H04B 3/36
[52] U.S. Cl. ................. 370/85.11; 370/97
[58] Field of Search ............ 370/85.1, 85.2, 85.9, 370/85.11, 110.11, 97, 93, 67, 94.3; 340/825.07, 825.08, 825.50; 375/3

[56] References Cited

U.S. PATENT DOCUMENTS

| | | | |
|---|---|---|---|
| 3,916,108 | 10/1975 | Schwartz | 370/85.11 |
| 4,426,697 | 1/1984 | Petersen et al. | 370/85.11 |
| 4,488,290 | 12/1984 | Dunn et al. | 370/85.1 |
| 4,611,324 | 9/1986 | Giacometti et al. | 370/97 |
| 4,700,342 | 10/1987 | Egami | 370/97 |
| 4,779,263 | 10/1988 | Manabe et al. | 370/97 |
| 4,782,481 | 11/1988 | Eaton | 370/85.1 |
| 4,837,788 | 6/1989 | Bird | 370/97 |
| 5,105,421 | 4/1992 | Gingell | 370/85.1 |

FOREIGN PATENT DOCUMENTS 0132069 1/1985 European Pat. Off. .
0207472 1/1987 European Pat. Off. .
62-155694 of 1987 Japan .
62-161295 7/1987 Japan .
61-274447 12/1987 Japan .

OTHER PUBLICATIONS

Stallings, Data and Computer Communications, 1988, pp. 22 and 39.
Georg Faerber, R. Oldenbourg Verlag, "Bussysteme", Muenchen, Wien, 1984, pp. 42–47 (no translation).
R. A. Scheetz et al., "A VME-VMX Interface to Fastbus via the Lecroy 1821 Segment Manager", IEEE Transactions on Nuclear Science, vol. 34, Aug. 1987, N.Y., pp. 1036–1038.

Primary Examiner—Douglas W. Olms
Assistant Examiner—Chau T. Nguyen
Attorney, Agent, or Firm—Rothwell, Figg, Ernst & Kurz

[57] ABSTRACT

A system for carrying out data communication between a plurality of communication cards which respectively fall into a plurality of shelves and are mounted therein. The communication system has data buses each provided for each shelf and used to perform data transfer. When two communication cards to be subjected to the data transfer belong to different shelves, a bus repeater latches data of the communication card on the transmission side and sends the latched data to a data bus of a shelf to which the communication card on the reception side belongs. Further, an exchange control card specifies a pair of addresses to thereby determine which two communication cards of the plurality of communication cards should be subjected to data transfer.

1 Claim, 5 Drawing Sheets

COMMUNICATION SYSTEM BETWEEN COMMUNICATION CARDS MOUNTED SEPARATELY IN SHELVES

BACKGROUND OF THE INVENTION

1. Field of the Invention

The present invention relates to a communication system suitable for use in a multiplexing apparatus or the like, and specifically to a system for carrying out data communication between respective communication cards mounted in shelf configurations for controlling the transfer of data between the respective communication cards.

2. Description of the Related Art

FIG. 5 is a view showing the structure of a system for effecting data communication between respective communication cards using a conventional paired-address method. In FIG. 5, reference numeral 5 indicates an upper shelf which accommodates therein one or more trunk cards (also hereinafter called "cards A") 2 and an exchange control card 100 for controlling data communication between respective communication cards. Reference numeral 6 indicates a lower shelf which accommodates one or more trunk cards (also hereinafter called "cards B") 4 therein. Further, designated by numeral 10 is a communication card selection bus for causing a communication card selection signal to pass therethrough, and designated by numeral 11 is a bidirectional data bus.

The operation of the above communication system will now be described below. When it is necessary to effect the transfer of data between the trunk cards 2 and 4, the exchange control card 100 sends addresses of both a communication card A and a communication card B to the communication card selection bus 10 as shown in FIG. 6.

Accordingly, the communication card A, which has been selected during the first period ($t_1$) of the entire period corresponding to a pair of addresses, brings data "dB" from the data bus 11 in synchronism with a clock ($t_3$) after two clocks. Further, the communication card A outputs data "dA" to the data bus 11 in synchronism with a clock ($t_4$) subsequent to three clocks. On the other hand, the communication card B, which has been selected during the latter half ($t_2$) of the entire period corresponding to the pair of addresses, outputs data "dB" to the data bus 11 in synchronism with the clock ($t_3$) after one clock and brings data "dA" from the data bus 11 in synchronism with the clock ($t_4$) after the two clocks.

Thus, the transfer of the data between the respective communication cards is carried out by using the pair of addresses as a single data transfer unit.

The conventional system for effecting the data communication between the communication cards mounted in the shelf configurations are constructed as described above. Therefore, the conventional system is accompanied by problems that when the transfer of the data between the communication cards which belong to the shelves 5, 6 different from each other, is carried out, the amount of delay of data with respect to the other increases, thereby causing inconvenience that data on the data bus 11 is not yet determined in data take-in timing, and the transfer of the data between the respective communication cards cannot be securely effected when a data transfer speed increases.

Incidentally, as the prior arts, there are known techniques disclosed in Japanese Patent Application Laid-Open Publication Nos. 623-155694 and 62-161295.

SUMMARY OF THE INVENTION

With the foregoing problems in view, it is therefore an object of the present invention to provide a system for effecting data communication between respective communication cards mounted in shelf configurations, wherein the transfer of data therebetween can be reliably carried out even if a data transfer speed increases.

In order to achieve the above object, there is provided a communication system of the present invention, which has a bus repeater. When communication cards belong to different shelves upon transfer of data between the respective communication cards, the bus repeater latches the data once therein and sends it to a data bus of a shelf on the reception side. Therefore, the data transfer can be securely carried out even if the data transfer speed increases.

The above and other objects, features and advantages of the present invention will become apparent from the following description and the appended claims, taken in conjunction with the accompanying drawings in which preferred embodiments of the present invention are shown by way of illustrative example.

DETAILED DESCRIPTION OF THE PREFERRED EMBODIMENTS

Figure 1:
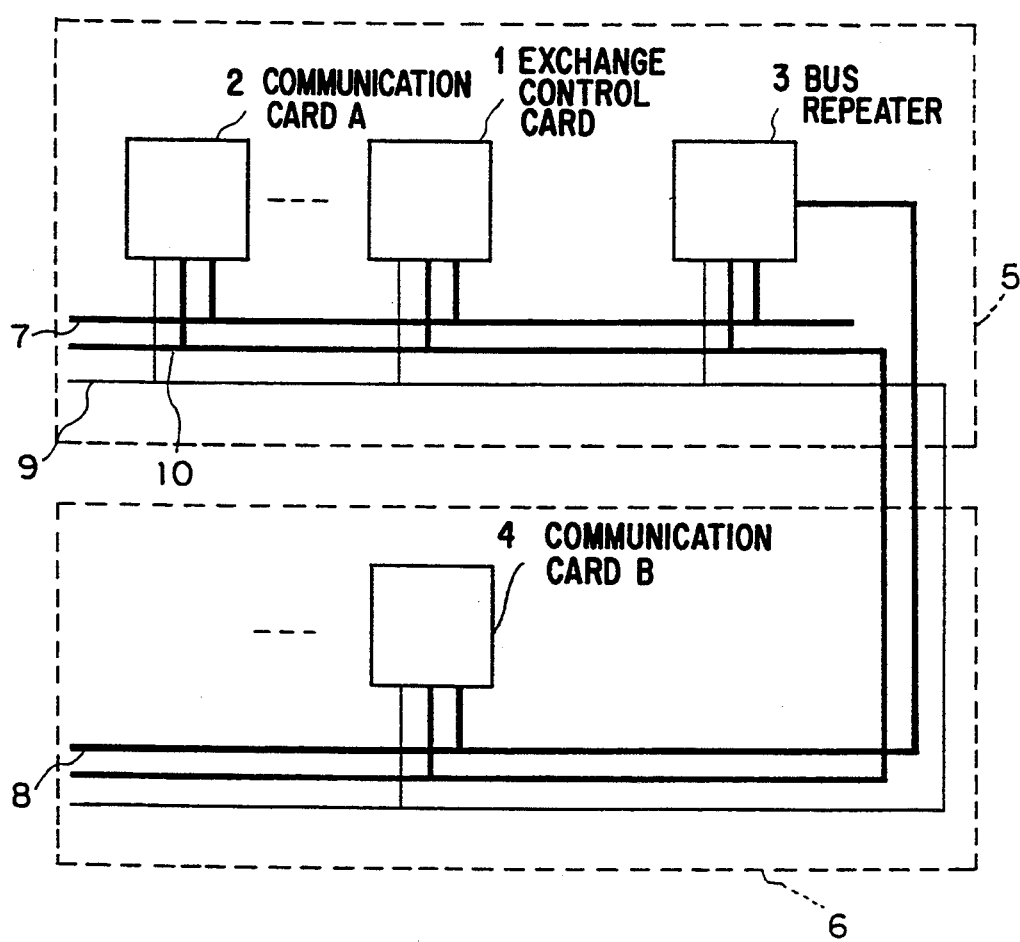
FIG. 1 is a schematic view showing the structure of a system according to one embodiment of the present invention, for effecting data communication between respective communication cards mounted in shelf arrangements.

Embodiments of the present invention will hereinafter be described with reference to the accompanying drawings. In FIG. 1, reference numeral 1 indicates an exchange control card for performing a process for outputting a bus repeater signal. Reference numeral 2 indicates a trunk card (communication card A) provided in plural form. Designated by numeral 3 is a bus repeater for latching data therein in response to the bus repeater signal and outputting the data therefrom. Reference numerals 4, 5 and 6 respectively indicate a trunk card (communication card B) provided in plural form, an upper shelf (shelf) and a lower shelf (shelf). Further, reference numerals 7, 8, 9 and 10 respectively indicate a data bus in the upper shelf 5, a data bus in the lower shelf 6, a bus repeater signal bus through which the bus repeater signal is transmitted, and a card selection bus.

The operation of the present embodiment will now be described below. The bus repeater 3 is electrically connected to the data bus 7 of the upper shelf 5, the data bus 8 of the lower shelf 6, the bus repeater signal bus 9 and the card selection bus 10.

Figure 2:
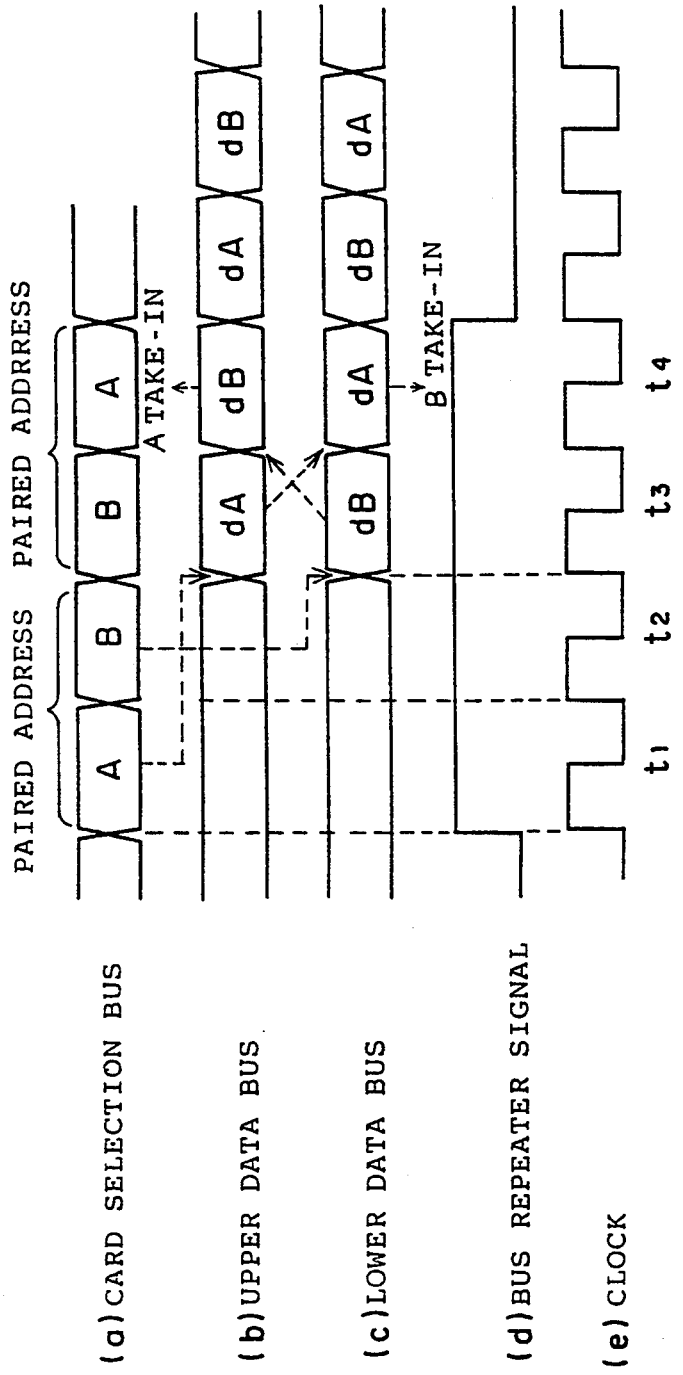
FIG. 2 is a timing chart for describing the timing of operation of the communication system shown in FIG. 1.
Figure 6:
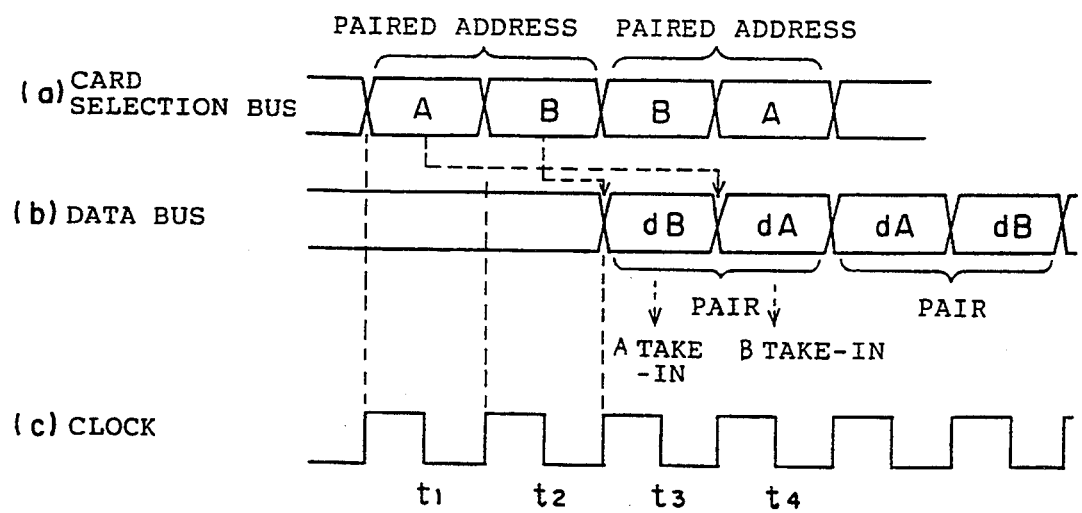
FIG. 6 is a timing chart for describing the timing of operation of the conventional system shown in FIG. 5.

When the transfer of data between respective communication cards located within the same shelf is performed, the exchange control card 1 does not bring the bus repeater signal into a significant condition. In this case, the transfer of the data therebetween is performed in the same system as that employed in a conventional example as illustrated in FIG. 6. When, on the other hand, the transfer of data is performed between respective communication cards in shelves different from one another, the exchange control card 1 brings the bus repeater signal to the significant condition as shown in FIG. 2.

Thus, when a communication card A, which has been selected during the first period ($t_1$) of the entire period corresponding to a pair of addresses, recognizes the significant condition of the bus repeater signal, the communication card A outputs data to the data bus 7 in synchronism with a clock subsequent to two clocks, i.e., during the first period ($t_3$) of the entire period corresponding to the next pair of addresses. When, on the other hand, a communication card B, which has been selected during the latter half ($t_2$) of the entire period corresponding to the pair of addresses, recognizes the significant condition of the bus repeater signal, the communication card B outputs data to the data bus 8 in synchronism with the clock after the first clock, i.e., during the first period ($t_3$) referred to above.

The bus repeater 3 brings data from the two data buses 7, 8 during the first period of the entire period corresponding to the next pair of addresses. During the latter half ($t_4$) of the entire period corresponding to the next pair of addresses, the bus repeater 3 then outputs the data brought from the data bus 7 to the data bus 8 and supplies the data brought from the data bus 8 to the data bus 7.

During the latter half ($t_4$), the communication card A brings the data from the data bus 7 and the communication card B brings the data from the data bus 8. Thus, when the bus repeater signal is in the significant condition, the communication card A outputs the data in timing faster than that at the time when the signal is not in the significant condition. Thereafter, the bus repeater 3 latches therein the so-outputted data together with the data outputted from the communication card B. Then, the bus repeater 3 outputs, in the next clock timing, data to the data buses 8, 7 on the opposite side of the data buses 7, 8 from which the data have been taken in.

Accordingly, the transfer of the data between the communication cards is completed in the same timing as that employed in the conventional example in terms of the timing. Further, the data are latched once by the bus repeater 3 in this case. If the bus repeater 3 is disposed substantially in the center of a long data bus comprising the two data buses 7, 8, then the maximum data delay amount developed during a period from the time when the data are output to the data bus 7, 8 to the time when the so-outputted data are taken in, becomes small as compared with that developed in the conventional example. That is, the above arrangement enables a reduction in the data delay amount and can securely perform the transfer of the data between the respective communication cards as compared with the case where the data are transmitted through the single long data bus without having the arrangement.

Figure 3:
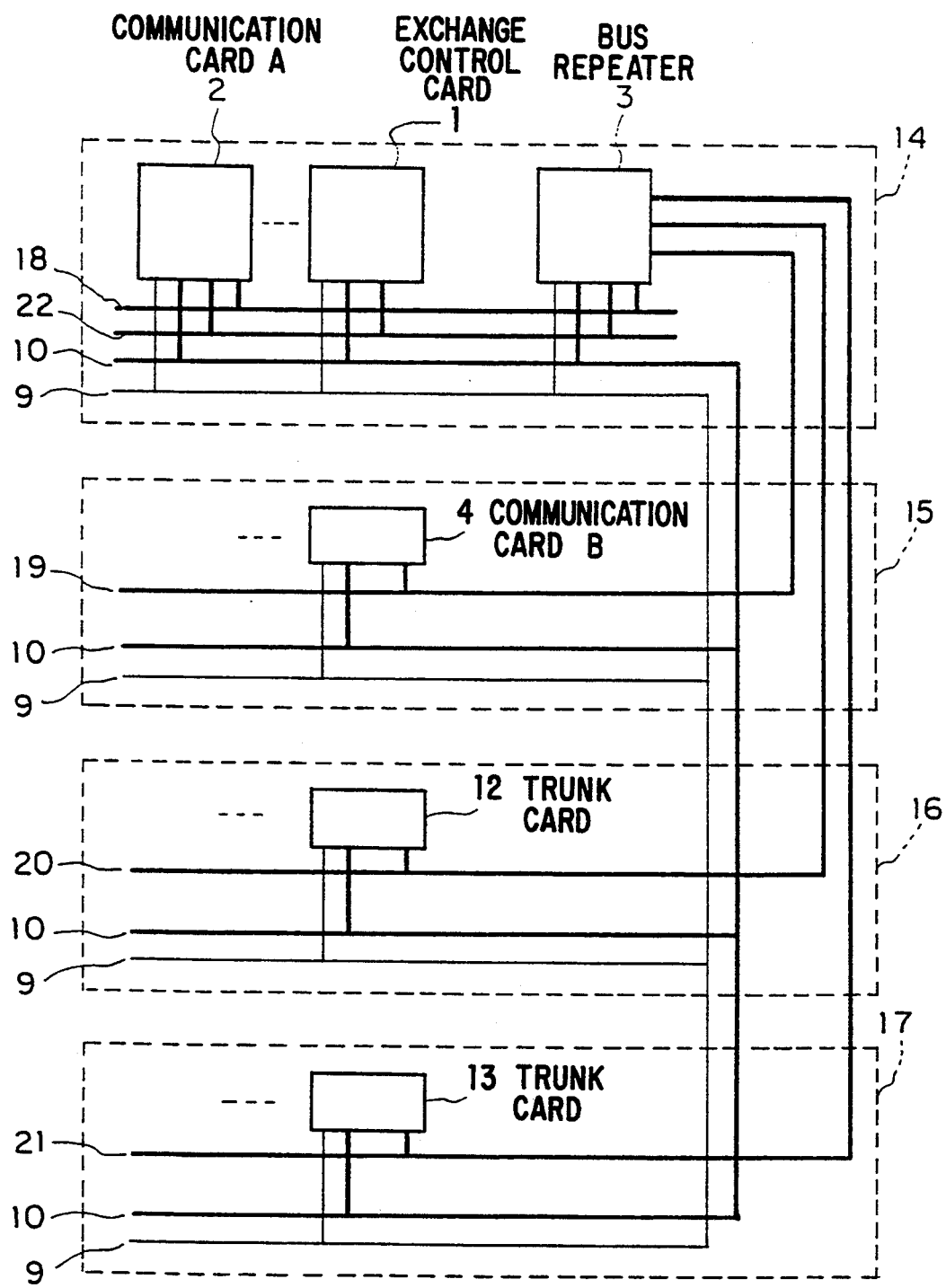
FIG. 3 is a schematic view illustrating the structure of a system according to another embodiment of the present invention, for effecting data communication between respective communication cards mounted in shelf arrangements.
Figure 4:
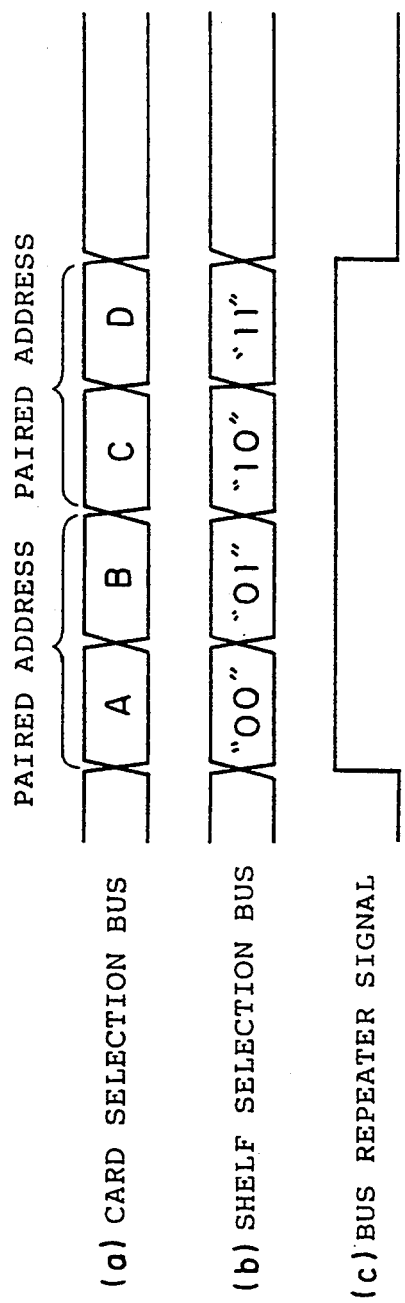
FIG. 4 is a timing chart for describing the timing of operation of the communication system shown in FIG. 3.
Figure 5:
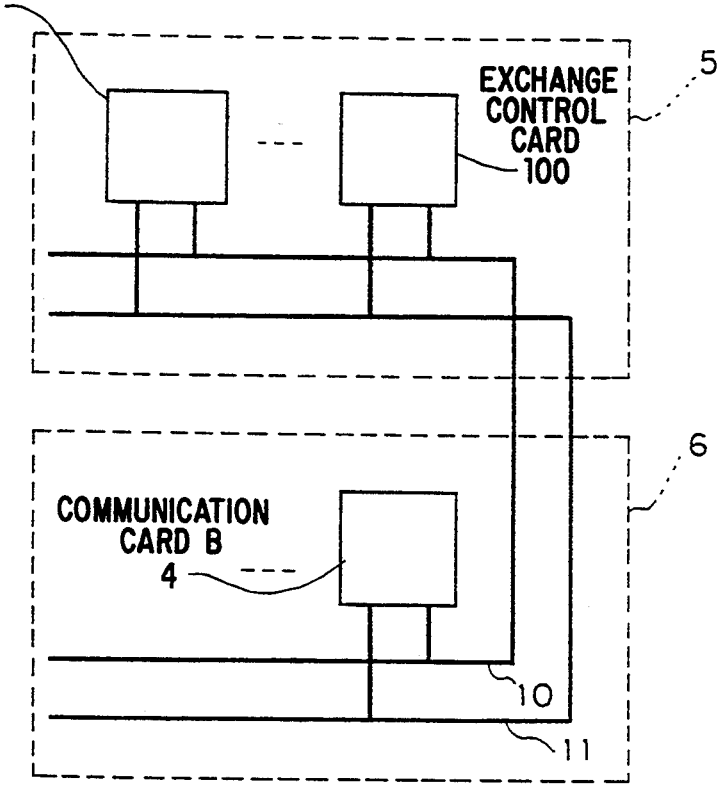
FIG. 5 is a schematic view showing the structure of a conventional system for effecting data communication between respective communication cards mounted in shelf arrangements.

FIG. 3 is a view showing a system according to another embodiment of this invention, for performing data communication between respective communication cards mounted in shelf configurations. In the same drawing, there are shown a trunk card 12 accommodated in a third shelf 16, a trunk card 13 accommodated in a fourth shelf 17, data buses 18 through 21 in their corresponding shelves 14 through 17, and a shelf selection bus 22 to which respective communication cards are electrically connected.

The operation of this embodiment will now be described below. When the transfer of data is performed between respective communication cards of shelves different from each other, an exchange control card 1 sends address data to a communication card selection bus 10 and transmits a shelf selection signal to the shelf selection bus 22. Further, the exchange control card 1 brings a bus repeater signal to a significant condition.

The respective communication cards are operated in a manner similar to those employed in the aforementioned embodiment. Further, a bus repeater 3 recognizes a shelf in which a communication card on the data transmission side is accommodated, and a shelf in which a communication card on the data reception side is held, in response to the shelf selection signal. Thus, the operation of this embodiment can be performed in a manner similar to that of the first embodiment provided that the data buses corresponding to these shelves are regarded as objects.

According to the present invention, as has been described above, a system for effecting data communication between respective communication cards mounted in shelf configurations is constructed such that data outputted to a data bus are latched once by a bus repeater. Therefore, the communication system can be reliably operated when the transfer of data between shelves different from each other is carried out.

Having now fully described the invention, it will be apparent to those skilled in the art that many changes and modifications can be made without departing from the spirit or scope of the invention as set forth herein.

What is claimed is:

1. A communication system between a plurality of communication cards mounted separately in a plurality of shelves, comprising:

a card selection bus connected to each of a plurality of communication cards;

data buses each provided for each of said plurality of shelves, each of said data buses being connected to each of said communication cards mounted in each shelf;

an exchange control card connected to said card selection bus, for specifying two communication cards to be subjected to data transfer, of said plurality of communication cards;

a bus repeater signal bus connected to said plurality of communication cards; and a bus repeater connected to said data buses and to said bus repeater signal bus, said bus repeater being activated by signals received from said bus repeater signal bus to latch a signal on a data bus connected to the communication card on the transmission side, of said two communication cards specified by said exchange control card when said two communication cards are mounted in different shelves, and to output the signal to a data bus connected to the communication card on the reception side, of said two communication cards;

wherein said exchange control card outputs a pair of addresses corresponding to said two communication cards to said card selection bus so as to specify said two communication cards; and wherein said bus repeater signal bus is also connected to said exchange control card, wherein said exchange control card sends a signal to said bus repeater signal bus so as to inform said communication cards and said bus repeater of a message indicative of a decision made as to whether said two communication cards belong to different shelves.

* * * * *